United States Patent [19]
Stiffler et al.

[11] Patent Number: 5,115,499
[45] Date of Patent: May 19, 1992

[54] SHARED COMPUTER RESOURCE ALLOCATION SYSTEM HAVING APPARATUS FOR INFORMING A REQUESTING COMPUTER OF THE IDENTITY AND BUSY/IDLE STATUS OF SHARED RESOURCES BY COMMAND CODE

[75] Inventors: Jack J. Stiffler, Hopkinton; James M. Nolan, Holliston; Peter Mark, Boston; David Harvey, Brookline, all of Mass.

[73] Assignee: Sequoia Systems, Inc., Marlborough, Mass.

[21] Appl. No.: 635,396

[22] Filed: Jan. 2, 1991

Related U.S. Application Data

[63] Continuation of Ser. No. 294,949, Dec. 30, 1988, abandoned, which is a continuation of Ser. No. 863,140, May 14, 1986, abandoned.

[51] Int. Cl.⁵ ............... G06F 12/02; G06F 12/06; G06F 13/20; G06F 13/30
[52] U.S. Cl. .................. 395/425; 364/228.1; 364/229; 364/229.5; 364/230; 364/230.3; 364/238.4; 364/239; 364/240.5; 364/240.8; 364/241.2; 364/246.1; 364/246.8
[58] Field of Search ... 364/200 MS File, 900 MS File

[56] References Cited

U.S. PATENT DOCUMENTS

| | | | |
|---|---|---|---|
| 3,444,525 | 5/1969 | Barlow et al. | 364/200 |
| 3,702,006 | 10/1972 | Page | 364/300 |
| 4,325,120 | 4/1982 | Colley et al. | 364/200 |
| 4,354,227 | 10/1982 | Hays, Jr. et al. | 364/200 |
| 4,399,504 | 8/1983 | Obermarck et al. | 364/200 |
| 4,402,046 | 8/1983 | Cox et al. | 364/200 |
| 4,484,273 | 11/1984 | Stiffler et al. | 364/200 |
| 4,541,094 | 9/1985 | Stiffler et al. | 364/200 |
| 4,574,350 | 3/1986 | Starr | 364/200 |
| 4,587,609 | 5/1986 | Boudreau et al. | 364/200 |
| 4,608,631 | 8/1986 | Stiffler et al. | 364/200 |
| 4,654,819 | 3/1987 | Stiffler et al. | 364/200 |
| 4,747,130 | 5/1988 | Ho | 379/269 |
| 4,752,872 | 6/1988 | Ballatore et al. | 364/200 |

Primary Examiner—Thomas C. Lee
Assistant Examiner—Daniel Pan
Attorney, Agent, or Firm—Wolf, Greenfield & Sacks

[57] ABSTRACT

Computer system resources shared by several central processing units are allocated by allowing one processing unit to temporarily gain exclusive access to a particular shared resource. Access to a particular resource is controlled by a memory location which contains information representing the current state of the resource and the identity of any processing element currently utilizing the resource. In the case where several resources are interchangeable, the memory location may also contain information regarding the busy/idle states of other interchangeable resources. The memory location can be interrogated by any of the processing elements via command and address information. If the contents of the memory location indicate that the associated resource is not in use, then the interrogating processing element immediately obtains control of the resource. If the resource is in use, the identity of the processing element currently using the resource and any stored resource state information is returned to the interrogating processing element which can then continue processing without the resource or choose another idle resource.

3 Claims, 3 Drawing Sheets

SHARED COMPUTER RESOURCE ALLOCATION SYSTEM HAVING APPARATUS FOR INFORMING A REQUESTING COMPUTER OF THE IDENTITY AND BUSY/IDLE STATUS OF SHARED RESOURCES BY COMMAND CODE

This application is a continuation, of application Ser. No. 07/294,949, filed Dec. 30, 1988, now abandoned which is a continuation, of application Ser. No. 863,140, filed May 14, 1986, now abandoned.

FIELD OF THE INVENTION

This invention relates to multi-processor, multi-tasking data processing systems with shared elements and to arrangements for allocating the shared elements in such systems among the processors.

BACKGROUND OF THE INVENTION

In order to increase processing speed and throughput, it is common practice to utilize computer systems which have two or more independent central processing elements. Such systems are commonly used to construct large high-speed data processing systems and also to construct fault-tolerant systems which can continue to operate even in the event of circuit failures. Generally, in such systems other system resources, such as the memory elements and peripheral elements are shared by the multiple processing elements to reduce overall system costs.

In many single-processor and multi-processor systems, the processing elements are also multi-tasking in that several programs or tasks can be sequentially run on each processing element. The operating system software for many multi-tasking, multi-processor systems can execute on any of the processing elements in the system and may, in fact, execute on several processing elements at the same time. Since the operating system software typically allocates shared resources among the various system resources, a mechanism is needed to guarantee that the operating system software executing in several processing elements does not simultaneously attempt to use or modify the same shared resource from different processing elements.

An illustration of this problem is provided by a typical procedure by which the operating system running in a processing element in a multi-processor system selects a new task for the processing element to execute. Conventionally, this procedure begins by a processing element reading "queue pointer" information from a shared memory element. From the queue pointer information, the processing element determines the location in memory of the identity information for the highest-priority task waiting to be executed. After the task identity information has been read from memory, the task is selected by the processing element for execution. The processing element then changes the queue pointer information in the shared memory element to point to the location of the identity information of the next highest-priority task on the queue of tasks waiting to be executed.

A resource allocation problem occurs when several processing elements are carrying out this latter selection procedure at the same time and two or more processing elements attempt to read the same queue pointer information and select the same task for execution before any one of the processing elements has had a chance to change the pointer information to point to the next task on the queue. Although, in accordance with conventional memory construction, only one processing element can physically access a given memory element at any one time, a problem can still arise due to two interleaved accesses by different processing elements.

More specifically, each processing element typically executes a task by performing a predefined set of operations which set may involve two or more accesses to a memory element to obtain, modify and then store the modified information. If the stored information is modified during this sequence by another processing element, and the first processing element is not informed of the change, an error may result.

For example, in the previous illustration, during the task selection process, each processing element treats the initial read operation to obtain the queue pointer information and the subsequent write operation to modify the queue information as part of the same overall operation. Accordingly, the processing element does not expect the data in the memory element to be modified between the read and write operations. If another processing element accesses the memory between the read and write operations, a resource conflict results.

One prior art method of solving this resource allocation program is to constrain the operating system software to run on only one processing element. Such an approach, while effective in allocating resources presents problems for high-speed systems because the single-processor limitation becomes a bottleneck for the remainder of the system. In fault tolerant systems, a more serious problem is created if the processing element which is running the operating system fails.

Accordingly, it is an object of the invention to provide a computer resource allocation system which allocates resources among multiple processing elements in a multi-processor system.

It is another object of the present invention to provide a computer resource allocation system which allows each processing element in a multi-processor system to temporarily gain exclusive access to a particular shared resource.

It is still another object of the present invention to provide a computer resource allocation system which can be implemented using available shared memory resources.

It is yet another object of the present invention to provide a computer resource allocation system which can also insure equal utilization of multiple shared resources.

It is a further object of the present invention to provide a computer resource allocation system which can be used with many types of shared resources including memory and peripheral units.

SUMMARY OF THE INVENTION

The foregoing problems are solved and the foregoing objects are achieved in one illustrative embodiment of the invention in which a test-and-set lock location is associated with each of the shared resources. A test-and-set lock location is a storage location in a shared memory resource which contains information regarding the state of the associated resource and the identity of the processing element, if any, currently using the associated resource. In order to determine whether a particular resource is in use or not, a processing element interrogates the associated lock by presenting an address code to the lock control circuitry. The address code consists of address signals that specify the lock location and command signals which tell the control circuitry how to change the lock information. An access to a lock location by an interrogating processor results in the reading the information stored in it. If the resource is free, as indicated by coded information stored in the lock location, the interrogating processing element then immediately gains temporary control of the associated resource and identifying information for the processing element is written into the lock location.

Alternatively, if the resource is in use at the time of the interrogation (also, as indicated by the state information stored in the lock location) the identity of the processing element currently utilizing the resource is returned to the interrogating processing element.

Each time an access is made to a particular test-and-set lock location, the stored resource state and processing element identity information is updated via control circuitry which responds to the information presently stored in the lock location and the command signals sent by the interrogating processing element.

By proper coding of the resource state information, additional objects, such as the equal usage of multiple, interchangeable shared resources can also be achieved.

More particularly, two embodiments of the invention are disclosed, the first embodiment allocates a "unique" shared resource such as memory elements and retains the identity of the current user. The second embodiment allocates "interchangeable" resources such as buffers while recording the order in which the resources are used to insure that each resource is used equally often.

Specifically, the test-and-set lock locations can be implemented using either a shared read-only memory or a shared random-access memory. The memory is addressed by means of an address code word which contains an address portion, a command portion and a processing element identification code portion. Part of the address portion selects the particular memory which is used for test-and-set lock storage areas. Other portions of the address section of the address code word are used to select a particular test-and-set lock location within the selected memory.

The command portion of the address code word is used to generate new information which is to be stored in the selected memory location. This new information includes an updated resource status code if the resource is free and will be assigned to the interrogating processing element or if a processing element currently using a resource is releasing the resource for use by other processing elements.

The resource state code information, in addition to information indicating whether the resource is in use or not, may also have additional information added to it. In the case of multiple, interchangeable shared resources, the additional information may indicate the identity of the "next" free resource. In this way, usage of the resources by the system can be spread out among all of the available resources insuring that no one resource is used to the exclusion of the others.

The lock control circuitry is connected to the system data bus so that information stored in a selected lock location can be returned to the interrogating processing element. By examining the state information, the processing element can determine whether the associated resource is in use or is free and if the associated resource is in use, the identity of the processing element currently using the resource can be determined.

DETAILED DESCRIPTION OF THE PREFERRED EMBODIMENT

Figure 1:
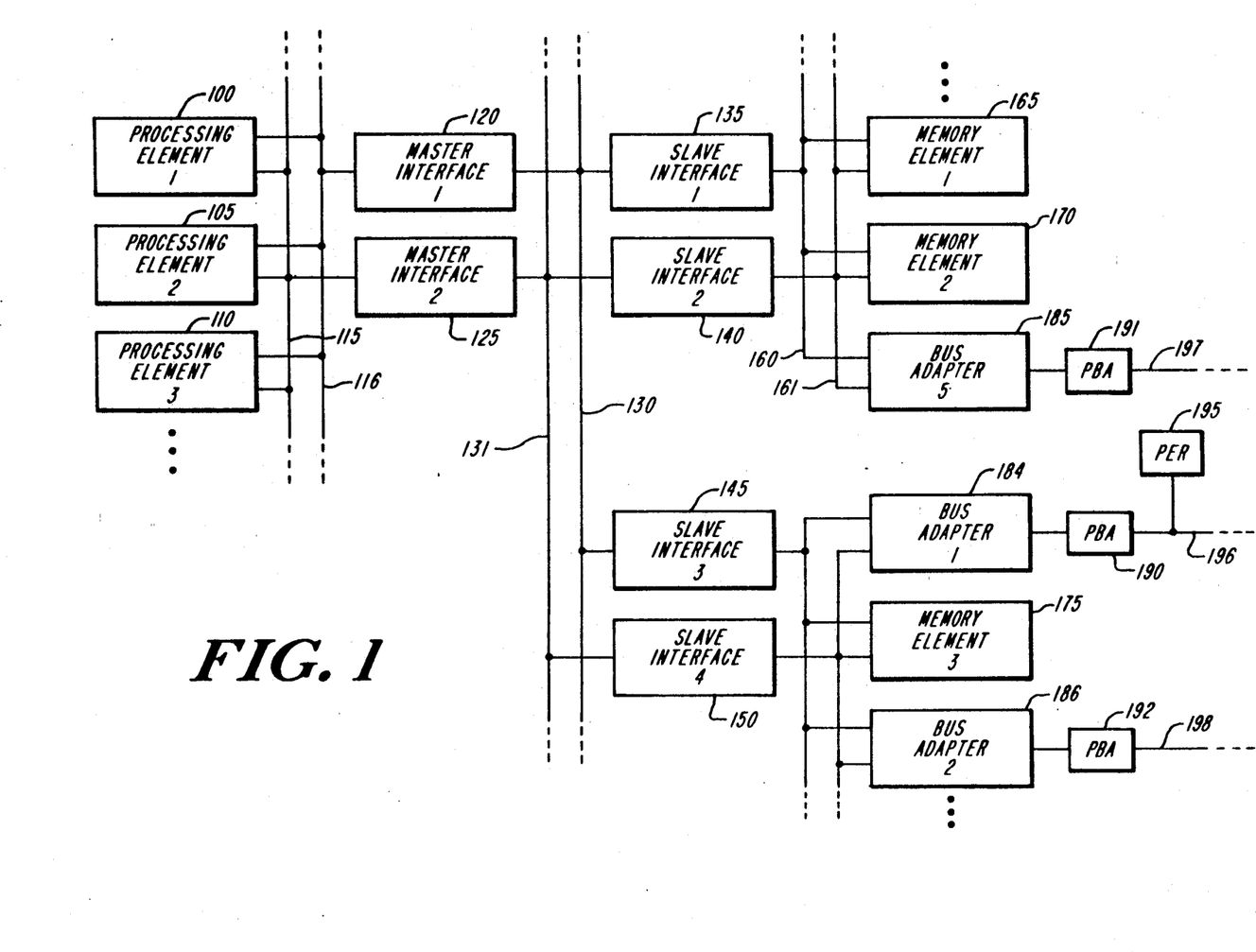
FIG. 1 shows a block schematic diagram of a prior art computer system arrangement utilizing the inventive memory allocation system.
Figure 2:
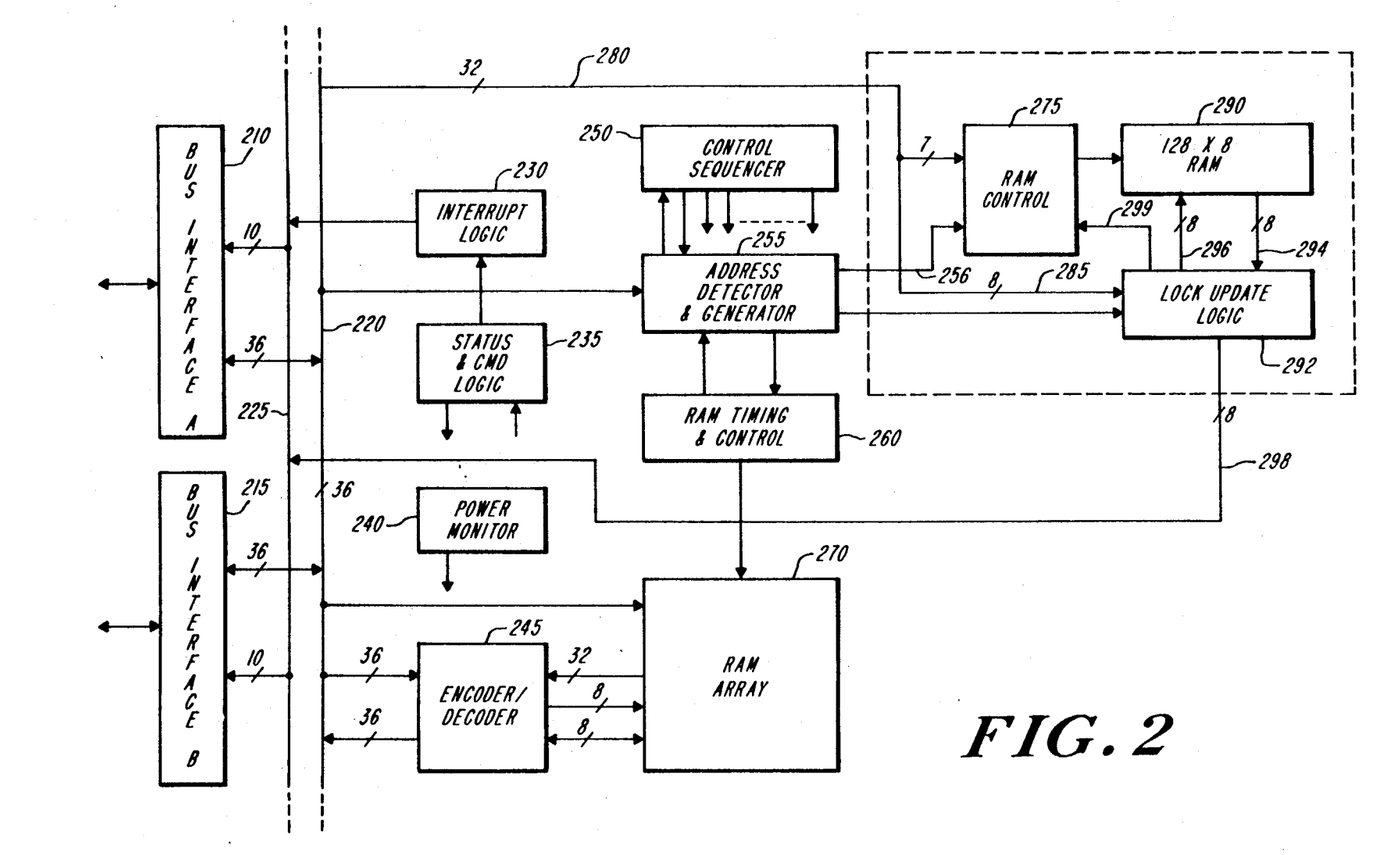
FIG. 2 is a more detailed block diagram of the memory element shown in FIG. 1, including the inventive resource allocation circuitry.
Figure 3:
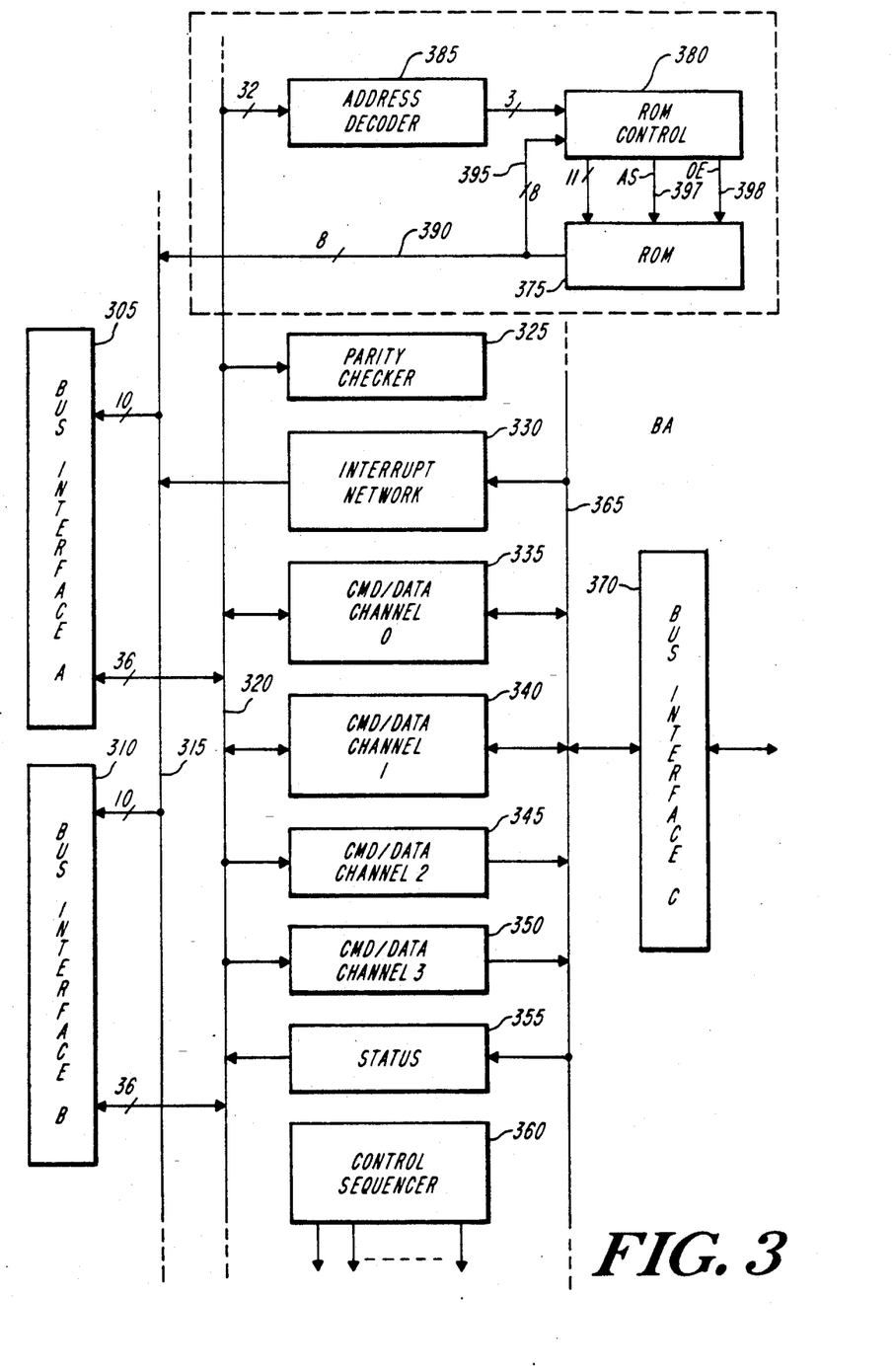
FIG. 3 is a more detailed block diagram of the bus adapter unit shown in FIG. 1 which also incorporates an alternative embodiment of the inventive resource allocation system.

An illustrative multi-processor computing system is shown in block schematic form in FIG. 1. For the purposes of this invention, the overall computer system will only be described in summary form. A more detailed description of the illustrative system is contained in U.S Pat. No. 4,484,273 issued on Nov. 20, 1984 to Jack J. Stiffler, Richard A. Karp, James M. Nolan, Michael Budway and David Wallace entitled "Modular Computer System", which description is hereby incorporated by reference. FIGS. 1, 2 and 3 of this description correspond to FIGS. 1, 6 and 7 of that patent with the corresponding elements labeled similarly.

The illustrative system is comprised of three main elements: processing elements (100–110), memory elements (165, 170, 175) and peripheral elements (195). All of the elements are connected to duplicated, common system buses, 130 and 131, which are used to increase throughput of the system and provide backup operation in case of a failure due to a fault. Similarly, for reliability and speed purposes, interface units 120, 125 and 135–150 which connect the processing, memory and peripheral elements to the system busses are also duplicated. Busses 130 and 131, although shown as a single line are actually multi-wire buses comprising 32 separate signal lines.

Although up to sixty-four processing elements (PEs) may be added to the illustrative system to perform processing of programs or tasks simultaneously, in FIG. 1 only three processing elements 100, 105 and 110 are shown for clarity. Each of the processing elements is identical and contains a central processor which is a conventional data processing device capable of executing both user application programs and supervisory programs which control and coordinate the operation of the associated processor.

Although each processing element contains identical circuitry, each processing element is assigned a unique identification number which is determined by the electrical wiring of the connector slot into which the processing element module is inserted. The identification number is used to identify each processing element to its associated master interface for control transfer and bus access operations. In addition, as will hereinafter be described, the unique identification number may be stored in the identification section of a particular test-and-set lock location to identify the processing element which is currently utilizing the associated resource.

All the processing elements are connected to redundant processor buses, such as buses 115,116 which are duplicated for reliability purposes and increased throughput. Access to buses 115 and 116 and to system buses 130 and 131 by the processing elements is controlled by master interface units 120 and 125 which are also duplicated for reliability and throughput purposes.

Each master interface unit contains sequence and control logic and arbitration circuitry which selectively connects the processing elements to one of the system buses 130 and 131.

The system buses 130 and 131 can be connected to memory elements 165-175 and peripheral bus adapters 184-186 by means of slave interfaces 135, 140 and 145, 150, respectively. Each slave interface is identical and is duplicated for reliability and throughput purposes. Each slave interface in a pair can be used to provide an access path to one memory element or bus adapter in its associated group while the other slave interface simultaneously provides an access path to a second memory element or bus adapter. Slave interfaces 135-150 contain circuitry which converts the signals produced by memory elements 165-175 and peripheral unit 195 (via peripheral bus adapters 190-184) into signals which are compatible to signals used on the system buses 130 and 131.

More particularly, slave interfaces 135 and 140 connect system buses 130 and 131 to memory buses 160 and 161. Although only two memory bus pairs 160, 161 and 155, 156 are shown for clarity up to sixteen redundant memory bus pairs may be added to the illustrative system.

Memory buses 160 and 161 are, in turn, connected to a plurality of memory elements and bus adapters, of which three devices (memory elements 165, 170 and bus adapter 185) are shown.

The system peripherals, for example, mass storage units, printers and terminals, are connected to the system by means of plurality of peripheral buses of which buses 196 and 198 are shown. Buses 196 and 198 are, in turn, coupled to memory buses 155 and 156 by interface circuitry consisting of bus adapters of which two adapters, 184 and 186, are shown. Peripheral bus adapters, of which units 190 and 192 are shown, connect the bus adapter units it the actual peripheral buses. Each bus adapter contains buffer memories and data processing logic which can buffer and format data information retrieved from the peripheral bus adapters and commands received from the processing elements via the system buses.

In the illustrative system, memory elements 165, 170 and 175 are shared resources which can be used by any of the processing elements 100-110. Similarly, the peripheral units attached to bus adapters 184-186 can also be shared by any of the processing elements 100-110. Although the recited resources are shared, the elements which comprise these resources (for example, a specific memory location or a particular buffer in a bus adapter) cannot be simultaneously accessed and modified by two different processing elements.

In addition, the locations in memory elements 165, 170 and 175 can be thought of as containing "unique" information in that the information in specific locations is typically used by one processing element for the entire time that it is processing a particular task. Conversely, the buffers in the bus adapters are "interchangeable" since they are generally used for only temporary storage. In the two embodiments of the invention which follow, the first embodiment uses random access memories to allocate a "unique" shared resource such as memory elements and to retain the identity of the current user. The second embodiment uses read-only memories to allocate "interchangeable" resources while recording the order in which the resources are used to insure that each resource is used equally often.

A more detailed functional block diagram of a memory element such as memory element 165 is shown in FIG. 2. All memory elements contain identical circuitry and only one will be discussed in detail for clarity. For additional information on the operation of the circuitry contained in a memory element, see U.S. Pat. No. 4,484,273, referenced above.

Each memory element is connected to both redundant memory buses by means of interfaces 210 and 215 which filter and buffer address, data, interrupt and control information on lines which are connected to the memory buses. Incoming information is passed by interfaces 210 and 215 to an internal address bus 220 where the information is provided to an address detector and generator circuit 255. Circuit 255 decodes and detects addresses to which the associated memory element is programmed to respond. In addition, in accordance with well-known principles, circuit 255 generates a sequence of address information which is needed to access a block of data stored in random access memory array 270. The information produced by circuit 255 is also provided to a RAM timing and control circuit 260 which generates timing signals and control signals that are used to access RAM memory array 270.

In response to the address signals generated by the timing and control circuit 260, RAM array 270 provides stored information and associated stored parity check bits to encoder/decoder circuit 245. Circuit 245 identifies and corrects errors in accordance with well-known error correction techniques and also generates byte parity bits which are sent along with all retrieved information from RAM array 270.

Also included in the memory circuitry are interrupt logic 230, status and command logic 235, a power monitor circuity 240 and a control sequencer 250. The control sequencer 250 generates control and synchronization signals which are used to sequence the memory element through its various operations.

The power monitor circuit 240 monitors the system power supply and generates a "clear" or reset signal when power is first applied to the memory element or during a standby operation in which only refresh power is applied to the memory element.

Status and command logic 235 stores status information (for example, fault conditions and the address being accessed at the time of a fault, etc..) for external access by the processing elements during a fault condition.

Interrupt logic 230 initiates interrupts to the master interface in the event of a fault in the memory element or when power is initially applied to the memory element to indicate the memory element is functioning and available.

In accordance with the first embodiment of the invention which allocates resources that are "unique", each memory element which is used to provide test-and-set lock locations contains a special RAM memory which has 128 accessible locations that can be interrogated or read by any processing element in the system. Each of the locations constitutes a "lock" location and contains information regarding the status of a particular shared resource. The correspondence between a particular "lock" and a particular shared resource is assigned by the operating system. Thus, for example, one such RAM memory location, or lock, could be assigned to the queue pointer described previously and used to prevent one processing element from accessing the pointer location at a time when another processing element is attempting to select a task from the queue of tasks waiting to be executed.

The lock locations in the RAM memory can be interrogated by any processing element in the system and the information returned to the processing element contains the "state" of the "lock" or the associated resource (the state of the lock indicates whether the corresponding shared resource is idle or busy) and, if the resource is busy (if the resource is busy, the lock is termed as "held" by a processing element), the identity of the processing element currently holding that lock. If the lock state indicates that the lock (and, thus, the associated resourced) is available, the interrogating processing element has succeeded in obtaining the lock and, thereby, temporarily succeeded in gaining exclusive access to the corresponding resource. The successful processing element retains exclusive access to the resource until it releases the lock. Any subsequent requests for the lock before it has been released will return to the new interrogating processing element the identity of the processing element holding the lock along with a lock state indicator showing that the lock is temporarily unavailable.

Upon interrogating a lock and finding that it is unavailable, the interrogating processing element may continue to request the lock until it becomes available or interrupt the processing element holding the lock by using the an interrupt mechanism described in in detail in U.S. Pat. No. 4,484,273. By this interrupt mechanism, the requesting processing element informs the holding processing element that there is another processing element waiting for the lock. Alternatively, the requesting processing element may begin executing some other task not needing the resource protected by the lock and return later to the task which needs the resource protected by the lock.

The apparatus which implements the test-and-set locks is shown in the dotted box in FIG. 2. This additional apparatus consists of 128 word by 8 bit RAM memory 290, RAM memory control 275 and lock update logic 292.

In the 128 word by 8 bit RAM, each 8-bit word represents one test-and-set lock in which information is stored in a predetermined format. More particularly, bits 0 and 1 constitute the lock state indicator. Information is coded into these bits in accordance with the code in Table I as follows:

TABLE I

| Bit 1 | Bit 0 | Description |
|---|---|---|
| 0 | 0 | No current holder |
| 0 | 1 | Lock held by processing element identified in bits 2-7 |
| 1 | 0 | Undefined |
| 1 | 1 | Lock held by processing element identified in bits 2-7 and the lock has been previously requested by at least one other processing element. |

In the lock words, bits 2-7 specify the identity of the processing element, if any, currently holding the lock. The "11" lock state indication enables an interrogating processing element to determine that another processing element is also requesting the same lock. In some cases, this latter fact may be used by a processing element to determine whether to continue requesting a lock or to suspend the current task and return to it at a later time when the shared resource is available.

The test-and-set logic becomes operative when it is activated by a special set of addresses. These addresses are decoded in the address detection and generation circuitry 255 which is actually part of the memory element address decoder logic. The special addresses designating the test-and-set lock circuitry contain, in addition to the identity of the memory element being addressed, seven bits specifying the specific lock location of interest, 6 bits identifying the interrogating processing element and 2 bits specifying one of three command types. These command types are designated as shown in Table II.

TABLE II

| Command Bits | Command Description |
|---|---|
| 00 | If the addressed lock is in state "00" change the state to state "01" and load the interrogating processing element identification code into bits 2-7 of the lock word. Alternatively, if the lock is in state "01" change the lock state to state "11" and leave the processing element identification code bits unchanged. Finally, if the lock is in state "11", leave the entire lock word unchanged. |
| 01 | Load the interrogating processing element identification information into bits 2-7 of the lock word unconditionally and leave the lock state unchanged. |
| 10 | If the processing element identification portion of the address matches the interrogating processing element identification portion of the lock word (bits 2-7) change the lock state to state "00". Otherwise leave the lock word unchanged. |
| 11 | Undefined. |

Therefore, command type "00" is used to request a lock and command type "10" is used to release a lock. The third command, type "01", is used only in fault situations; for example, a situation where a processing element fails while holding a lock. During the process of recovering from such a fault, another processing element must take over control of a lock held by the failed processor prior to the fault.

The operation of the lock apparatus is as follows: the seven address bits specifying the particular lock location of interest are provided, via the address bus 220 and bus 280, to RAM control 275. RAM control 275 is also provided with an "enable" signal over lead 256 from the address detector and generator 255 when this circuit responds to an incoming address indicating that the memory element is to respond to the address information. RAM control 275 contains conventional address decoding circuitry, which, in response to the address bits and the enable signal, accesses the proper location in RAM 290 and reads the contents of the location out onto memory output bus 294.

The output of the selected lock location in RAM 290, indicating the status of the lock word, is provided over data bus 294 to lock update logic 292. From lock update logic 292, the status information from RAM 290 is forwarded, over bus 298, to data bus 225 and, from there, back to the interrogating processing element.

In response to status information generated by RAM 290, lock update logic 292 generates new status information in accordance with the commands specified in Table II. More particularly, the eight bits of the incoming address which identify the requesting processing element and specify the command code are provided, over bus 285, to lock update logic 292. Lock update logic 292 decodes the command bits and places information indicating the new lock state on memory data input bus 296 which information is applied as a data input to RAM 290. Lock update logic 292 also places a write enable signal on lead 299 which is applied to RAM control 275. The write enable signal causes RAM 275 to write the new update information on bus 296 into RAM 290 at the location specified by the address signals provided, via bus 280.

The same test-and-set lock circuitry may also be used to allocate other resources such as buffer memories located in the bus adapter units which are "interchangeable". In this case the test and set lock circuitry is used to control access to a group of resources rather than controlling access to a single unique resource. An additional embodiment of the invention illustrates the use of the test-and-set lock circuitry to control access to a plurality of buffer memories in a bus adapter circuit to insure equal usage of the buffer memories.

FIG. 3 shows a more detailed functional block diagram of a bus adapter unit which is used to connect peripheral devices to the illustrative computer system. In particular, the bus adapter unit is connected to the redundant memory buses by means of bus interfaces 305 and 310. As with the memory element interfaces, each bus adapter interface provides filtering and buffering of interrupt, address, data and control lines. Address and data information passes through interfaces 305 and 310 and is placed on the internal address/data bus 320. Likewise, information generated by the interrupt network circuitry 330 is placed on the internal interrupt bus 315 and passes through interfaces 305 and 310 to the memory buses.

Interrupt network circuitry 330 contains well-known circuitry which generates and relays interrupt information indicating fault conditions, initial power status, the completion of input/output operations and other conditions to the interrupt bus.

Data information passing from the peripheral units to the memory bus and command and address information passing from the memory bus to the peripheral units passes, via the internal data bus 320, to command/data channels 335-350. Each of the command/data channels can accept command information generated by the processing elements and store the command information for access by a microprocessor located in an associated peripheral bus adapter unit (not shown in FIG. 3). In addition, some or all of the command/data channels 335-350 may contain an internal buffer memory which can buffer up to 4 kilobytes of input/output data generated by the peripheral devices or passing to the peripheral devices.

Information on the internal data bus is checked by parity checking circuit 325 which checks byte parity on the information received from the memory bus and flags any detected errors.

Also included in the bus adapter circuitry is a status register 355 which stores status information, such as fault conditions and the status of the peripheral units, for access by the processing elements. A control sequencer 360, which consists of well-known circuitry which generates a sequence of control signals needed to perform the various bus adapter functions.

Command and data information passing through the command/data channels 335-350 is provided to a local data bus 365 and from there to bus interface 370. Bus interface 370 and its companion bus interface (located in the peripheral bus adapter and not shown in FIG. 3) provide conversion and buffering for data and command signals passing between the bus adapter and the peripheral bus adapter circuit. The peripheral bus adapter unit performs conversions in the data and command information which is received by the bus adapter unit to place the information in proper format for utilization by the peripheral units connected to the peripheral bus. The operation and internal organization of the peripheral bus adapter unit is discussed in the aforementioned U.S. Pat. 4,484,273.

Each of channels 335-350 may be designated as command/data channels and each may contain a 4096-byte buffer memory to provide temporary storage of information passed between the main memory elements and peripheral storage devices located on the peripheral buses. Each of the 4096-byte buffer memories can be accessed by microprocessor located in the peripheral bus adapter unit in order to transfer information from peripheral devices to the system. The buffer memories can also be accessed by any processing element in the system in order to set up a direct memory access (DMA) operation between a bus adapter buffer memory and a section of main memory. Accordingly, it is necessary to coordinate access to the bus adapter buffer memories by the various elements in the system in order to prevent one element from attempting to use a particular buffer memory before another element is through using it.

Although there are many methods that can be used to control access to a particular buffer memory, in the alternative embodiment control of the bus adapter buffer memories is performed by means of the aforementioned "test-and-set" lock mechanism. With such a mechanism, the "busy" or "idle" status of each buffer memory is stored in a separate status memory associated with each bus adapter. Before an element attempts to access any of the buffer memories, it first checks the status memory to ascertain the present state of the buffer memory. If the status memory indicates that the buffer memory is "idle", the system element wishing to use the buffer memory changes the stored status indicator to "busy" and proceeds to access the buffer memory.

In addition to buffer memory access control, the instant test-and-set lock mechanism is also used to support backup of peripheral storage devices located on the peripheral buses. More particularly, a conventional method of recovering from the loss or failure of a peripheral storage device (for example, a disk) is to simultaneously store information in two such devices and force the two to contain identical information in each corresponding memory location. If one device subsequently fails, the duplicate information in the other device can be used to continue system operation.

To insure exact correspondence of information in the two devices, when information in one device is changed, then the other device must also be changed in the same way. Specifically, in the case of secondary disk storage, the physical disk locations at which various packets of information are stored depend upon the order in which the packets are received by the disk. Thus, it is necessary to guarantee that two disks which are being used as redundant storage receive information packets in the same order. The duplicated ordering is accomplished, as will hereinafter be described in more detail, by means of the lock mechanism of the instant embodiment.

Specifically, the order in which the buffer memories are used to transfer data is determined in part by code words stored in the status memory. The code words include a portion which identifies the next buffer memory to which information is to be transferred. Due to the stored codewords, the ordering of the memories is fixed in advance for a particular transfer sequence and, thus, the transfer order can be guaranteed to be the same even through two separate bus adapters are used, if the codewords stored in the status memory for each bus adapter are the same.

In addition to the previous two functions performed by the lock mechanism, the illustrative mechanism is used to assist in fault location by insuring that no buffer memory can remain unused for an extended period of time. In this manner each buffer memory is utilized on a regular basis and thus faults are exposed in the circuitry while they are still detectable. More specifically, the information stored in the buffer memories may be protected in a conventional manner by storing parity bits along with the data. This conventional fault detection scheme guarantees the detectability of any failure affecting only one bit in any data byte; however, failures which affect multiple bits in a particular byte may not be detectable.

In accordance with the illustrative inventive principles, the buffer memories have been designed so that no single component failure can effect more than one bit in a byte and, thus, buffer memory component failures are detectable by the parity scheme provided that the buffer is used frequently enough to expose the results of one component failure before a second component failure has occurred. However, unless special precautions are taken in a lightly-used system, it is possible that only one or two of the buffer memories would be used regularly. Accordingly, the lock mechanism in the illustrative embodiment insures that the buffer memories are used an equal portion of time. The likelihood that a second component failure occurs in a particular buffer before a first component failure is detected is thereby minimized. As with the memory ordering arrangement discussed above, usage of the buffers is controlled by careful encoding of the memory lock words.

The apparatus which implements the buffer memory lock mechanism is shown in the dotted box in FIG. 3. The additional circuitry consists of of read-only memory (ROM) 375 which stores the status code of the four buffer memories in command/data channels 335-350. ROM memory 375 is controlled by memory control circuit 380 and memory control circuit 380, in turn, receives address signals from address decoder circuit 385 which decodes address signals on address bus 320.

ROM 375 consists of a 2048 word by eight-bit ROM. The eight bits stored in each word location represent one of 173 possible combinations of the "lock" states of the four associated buffer memories. In accordance with the inventive lock scheme, each of the four buffer memories can be independently assigned to one of three "lock" states. The first of these three states is an "available" state (designated as state "0") in which the memory may be used by any system element. The second of the three states (designated as state "1") is a first "ready" state in which the buffer memory can receive data from, or transmit data to, a main memory. The third and final buffer "lock" state (designated as state "2") is a second "ready" state in which the buffer memory can receive data from, or transmit data to, the associated peripheral bus adapter unit. Each different chronological order of all buffers currently assigned to state "2" is represented as a different lock state combination (this distinguishability is needed to preserve the order information referred to earlier). With these assignments, the 173 possible lock state combinations (corresponding to status memory words) can be enumerated as follows:

TABLE III

| Number of buffers in | | | Total number of different possible combinations |
|---|---|---|---|
| State 0 | State 1 | State 2 | |
| 4 | 0 | 0 | 4 |
| 3 | 1 | 0 | 4 |
| 2 | 2 | 0 | 8 |
| 1 | 3 | 0 | 4 |
| 0 | 4 | 0 | 1 |
| 3 | 0 | 1 | 4 |
| 2 | 1 | 1 | 12 |
| 1 | 2 | 1 | 12 |
| 0 | 3 | 1 | 4 |
| 2 | 0 | 2 | 12 |
| 1 | 1 | 2 | 24 |
| 0 | 2 | 2 | 12 |
| 1 | 0 | 3 | 24 |
| 0 | 1 | 3 | 24 |
| 0 | 0 | 4 | 24 |

In Table III, it should be noted that the total number of combinations in which all four memories are in state 0 is four, not one, as might be expected. This is because part of the eight-byte word stored in each location of the status memory is a code indicating the identity of the next available buffer (if any). In order to insure each of the four buffers is, on average, used as frequently as any of the other buffers, the four combinations in which all buffers are in state "0" correspond to the four possibilities for the first available buffer.

Similarly, in Table III, the number of lock state combinations in which two memories are in state "0" and two buffers are in state "1" is eight combinations rather than six combinations. This is because the two combinations which consist of buffer memories nos. zero and two in state "1" and buffer memories nos. one and three in state "1" are each divided into two additional combinations with different memories designated as the next available memory. The four resulting combinations are: buffer memory nos. zero and two in state "1", buffer memory no. one available; buffer memory nos. zero and two in state "1", buffer memory three available; buffer memories one and three in state "1", buffer memory no. zero available; and buffer memories one and three in state "1", buffer memory two available. Thus, the addition of extra combinations helps to equalize the usage of the buffers.

In general, the following rules are used to insure that each buffer memory has an equal usage time. Except for the cases already specified, the next available buffer memory is determined as follows (buffer memories are numbered from i=0 to i=3):

1. Buffer memory no. i+1 (modulo-4) when only buffer memory no. i is busy;
2. Buffer memory no. i+j (modulo-4) when buffer memory no. i has been in state 2 longer than any other buffer memory currently in state 2 and buffer memory no. i+j is the idle buffer corresponding to the smallest positive integer j.
3. Buffer memory no. i +2 (modulo-4) where buffer memories i and i +1 (modulo-4) are both in state 1.
4. Buffer memory no. i when it is the only idle buffer.

The detailed circuit implementation is shown in FIG. 3. Specifically, ROM 375 is operated by control circuit 380 and address decoder 385. Address decoder 385 may be a separate additional circuit or may be part of the address decoder circuitry in one of channels 335-350.

Decoder 385 receives 32 address bits from address bus 320, which address bits are provided from the processing elements over the system address bus, via interfaces 305 and 310, or from the peripheral bus adapter, via bus interface 370.

Address decoder 385 responds to a subset of the addresses which select the particular bus adapter unit. This subset of addresses designates that the buffer lock mechanism has been addressed by an interrogating system element. When address decoder 385 receives the correct address subset indicating that the buffer lock mechanism is to be accessed, it activates ROM control circuit 380 and forwards three of the received address bits to circuit 380.

The address information forwarded to ROM control circuit 380 activates control logic causing the circuit to initiate an access to a new location in ROM 375. In the process of the accessing operation, control circuit 380 provides ROM 375 with 11 address bits. The address of the location selected in memory 375 is determined by concatenating the current 8-bit ROM data output on lead 390 with the three address bits forwarded by address decoder 385. The resulting eleven bits are presented to ROM 375 together with an address strobe signal on lead 397. In accordance with conventional ROM memory operation, the presentation by control unit 380 of address signals and an address strobe signal causes a particular location in ROM 375 to be accessed and the data therein to be placed in internal ROM registers. The data consists of a combination code indicating the state of the buffer memories and the identity of the next available buffer memory.

ROM control unit 380 subsequently places a signal on the output enable lead, 398, causing the selected ROM information in the internal ROM registers to be delivered to the output bus 390. The output signals on bus 390 are provided to the bus adapter data bus, 315, for transmission back to the processing element or for transmission to the peripheral bus adapter. The data information tells the accessing element the state of the four buffer memories in channels 335–350.

The contents of each location in ROM 375 are shown in Table IV. This encoded information together with the three address bits provided by address decoder logic 385 determine a particular location in the ROM memory.

TABLE IV

| Number of Buffers in | | | |
| --- | --- | --- | --- |
| State 0 | State 1 | State 2 | Encoded lock word |
| 4 | 0 | 0 | 0 0 0 0 0 0 a a |
| 3 | 1 | 0 | 0 0 0 0 0 1 b b |
| 2 | 2 | 0 | 0 0 0 0 1 c c c |
| 1 | 3 | 0 | 0 0 0 1 0 0 a a |
| 0 | 4 | 0 | 0 0 0 1 1 0 0 0 |
| 3 | 0 | 1 | 0 1 0 0 0 0 d d |
| 2 | 1 | 1 | 0 1 0 1 b b d d |
| 1 | 2 | 1 | 0 1 1 0 a a d d |
| 0 | 3 | 1 | 0 1 1 1 0 0 d d |
| 2 | 0 | 2 | 0 0 1 0 e e d d |
| 1 | 1 | 2 | 1 0 1 f e e d d |
| 0 | 2 | 2 | 0 0 1 1 e e d d |
| 1 | 0 | 3 | 1 0 0 f e e d d |
| 0 | 1 | 3 | 1 1 0 f e e d d |
| 0 | 0 | 4 | 1 1 1 f e e d d | where  aa = binary representation of the next available buffer
bb = binary representation of the locked state 1 buffer
ccc = 000 if buffers 0 and 1 are locked, buffer 2 is available TABLE IV-continued = 001 if buffers 1 and 2 are locked, buffer 3 is available
= 010 if buffers 2 and 3 are locked, buffer 0 is available
= 011 if buffers 0 and 3 are locked, buffer 1 is available
= 100 if buffers 0 and 2 are locked, buffer 1 is available
= 101 if buffers 1 and 3 are locked, buffer 2 is available
= 110 if buffers 0 and 2 are locked, buffer 3 is available
= 111 if buffers 1 and 3 are locked, buffer 0 is available dd = binary representation of the oldest state 2 buffer
ee = binary representation of the second oldest state 2 buffer
and
f = 0 if the third locked buffer is buffer i + j, modulo-4, with i the oldest state 2 buffer and j the smallest positive integer resulting in the designation of a buffer in an otherwise unspecified state;
= 1 otherwise The three address bits extracted by address decoder 385 from the address used to access the lock-and-test mechanism are also used by the accessing element to command the lock mechanism to perform one of three operations. More specifically, the three bits determine the next state of the buffer memory lock mechanism as follows:

1. If the 3 bits are all zeroes ("000") then the next state combination equals the current state combination. This latter address bit combination is used by the accessing element to examine the status of the buffers in the bus adapter unit. Accordingly, no change takes place in the status of the buffer memories. The current buffer memory status is returned via, the data bus, to the accessing unit.

2. If the three bits are "001", if a buffer memory is available (in state "0"), the next state combination equals the current state combination but with the available buffer memory changed from state 0 to state 1. If no buffer memories are available, the next state combination is equal to the current state combination. This address bit combination is used by a processing element to reserve a buffer memory for data transfers from main memory elements to the buffer memory.

3. If the address bits are "010" or "011", the next state combination is equal to the current state combination. These states are also used by either the processing elements or the peripheral bus adapter to request the status of the buffer memories in a particular bus adapter.

4. If the address bits are "1XX" (where "XX" designates a buffer memory number), if buffer memory no. XX is in state 1, then the next state buffer memory state combination is equal to the current state combination but with buffer memory no. XX changed from state 1 to state 2. Alternatively, if buffer memory no. XX is in state 2 then the next state combination is equal to the current state combination but with buffer memory no. XX changed from state 2 to state 0. If buffer memory no. XX is in state 0, then the next state combination equals the current state combination. This last address code is used to transfer a particular buffer memory from state 1 to state 2 (indicating that the buffer is available for access by the peripheral bus adapter) or from state 2 to state 0 (idicating that the transaction has been completed and that the buffer is again idle).

In order to insure that the order of information written to two peripheral units (such as disks) is the same for peripheral storage backup purposes, the above-described lock mechanism is used as follows. First, a processing element reserves a buffer memory in each of the bus adapters connected to the two storage devices into which data information is to be stored. The processing element then initiates a direct memory access operation (DMA) from the memory element containing the information to be stored simultaneously to the two reserved (or locked) buffers. More specifically, both bus adapters are addressed and instructed to receive the information being transferred.

Finally, both bus adapters are also instructed (as part of the DMA initiation operation) to change the lock states of the two reserved buffer memories from state 1 to state 2 immediately upon completion of the data transfer from the main memory element to the buffer memories.

What is claimed is:

1. In a computer system comprising:
   a plurality of data processing elements, each of said plurality of data processing elements being capable of sequentially executing a plurality of data processing tasks;
   a processor bus connected to each of said plurality of data processing elements for receiving signals from, and transmitting signals to, said data processing elements;
   a system bus;
   first interface means for connecting said processor bus to said system bus;
   a plurality of shared system resources, each of said plurality of shared resources having a busy and an idle status;
   a peripheral bus connected to each of said plurality of shared resources;
   second interface means for connecting said peripheral bus to said system bus;
   a memory location in one of said plurality of shared resources;
   means for selecting one of said plurality of data processing elements for performing one of said plurality of processing tasks, said selected data processing element including means for generating command codes;
   lock status circuitry in said one shared resources responsive to a first command code generated by said selected data processing element for returning to said selected data processing element a status code stored in said memory location, said status code indicating to said selected processing element the busy and idle status of each of said plurality of shared system resources; and
   lock update circuitry in said one shared resource responsive to a second command code generated by said selected data processing element for storing in said memory location an identifying code identifying one of said plurality of shared system resources which said selected data processing element can use for a subsequent data processing task, said identifying code being calculated in a predetermined manner from said command code and a status code stored in said memory location indicating the busy and idle status of each of said plurality of shared system resources.

2. A computer system according to claim 1 wherein said memory location comprises one location of a plurality of memory locations in a read-only memory.

3. A computer system according to claim 2 wherein said lock update circuitry operates so that usage of said plurality of shared resources is equal in time.

* * * * *